United States Patent Office 3,150,185
Patented Sept. 22, 1964

3,150,185
HYDROGENATION OF NITROHALOAROMATIC COMPOUNDS
John P. Luvisi, Park Ridge, Ill., assignor to Universal Oil Products Company, Des Plaines, Ill., a corporation of Delaware
No Drawing. Filed May 9, 1960, Ser. No. 27,477
3 Claims. (Cl. 260—576)

This invention relates to a process for the hydrogenation of nitrohaloaromatic compounds. More particularly this invention relates to a process for the hydrogenation of nitrohalobenzenes.

It has now been discovered that a novel reaction will occur when a nitrohaloaromatic compound such as nitrochlorobenzene is hydrogenated in the presence of noble metal catalysts and also in the presence of certain substantially inert organic diluents or solvents. The products thus formed which comprise an N-cyclohexylaniline are useful for preparing an excellent antioxidant for grease by condensation with formaldehype yielding bis-(N-cyclohexylaniline)methane. In addition to this use the N-cyclohexylaniline may also be nitrated and reductively alkylated to yield other antioxidants and antiozonants.

It is therefore an object of this invention to provide a novel process for the preparation of N-cyclohexylanilines.

A further object of this invention is to provide a process for the production of N-cyclohexylanilines by treating nitrohaloaromatic compounds with hydrogen in the presence of noble metal catalysts and certain organic solvents.

One embodiment of this invention resides in a process for the production of an N-cyclohexylaniline which comprises treating a nitrohaloaromatic compound with hydrogen in the presence of a noble metal catalyst and an organic solvent selected from the group consisting of acids, esters, amides and saturated hydrocarbons at hydrogenation conditions, and recovering the desired N-cyclohexylaniline.

A further embodiment of this invention resides in a process for the production of an N - cyclohexylaniline which comprises treating a nitrochlorobenzene with hydrogen in the presence of a noble metal catalyst and an organic acid solvent at hydrogenation conditions, and recovering the desired N-cyclohexylaniline.

Still another embodiment of the invention is found in a process for the production of an N-cyclohexylaniline which comprises treating a nitrohalobenzene with hydrogen in the presence of a noble metal catalyst composited on a solid support and an organic acid at a temperature in the range of from about 30° to about 250° C. and at a pressure in the range of from about 2 to about 200 atmospheres, and recovering the desired N-cyclohexylaniline.

A specific embodiment of the invention resides in a process for the production of an N - cyclohexylaniline which comprises treating a nitrohalobenzene with hydrogen in the presence of a noble metal catalyst composited on a solid support and a solvent comprising glacial acetic acid at a temperature in the range of from about 40° to about 100° C. and at a pressure in the range of from about 2 to about 200 atmospheres, and recovering the desired N-cyclohexylaniline.

A more specific embodiment of the invention is found in a process for the production of N-cyclohexylaniline which comprises treating o-nitrochlorobenzene with hydrogen in the presence of a catalyst comprising palladium composited on charcoal and a solvent comprising glacial acetic acid at a temperature in the range of from about 40° to about 100° C. and at a pressure in the range of from about 2 to about 200 atmospheres, and recovering the desired N-cyclohexylaniline.

Other objects and embodiments referring to alternative nitrohalo organic compounds, noble metal catalysts and substantially inert organic solvents will be found in the following further detailed description of the invention.

As hereinbefore set forth it has now been discovered that when a nitrohaloaromatic compound and particularly a nitrohalobenzene in which the halogen radical is selected from the group consisting of chlorine and bromine is hydrogenated in the presence of a noble metal catalyst and also in the presence of a solvent comprising a substantially inert organic acidic compound, the resultant reaction product will comprise an N-cyclohexylaniline. An illustrative example of the hydrogenation reaction which occurs according to the process of this invention is the treatment of o - nitrochlorobenzene with hydrogen in the presence of a noble metal catalyst comprising palladium composited on charcoal and in the presence of a solvent comprising glacial acetic acid, according to the following equation, to form N-cyclohexylaniline.

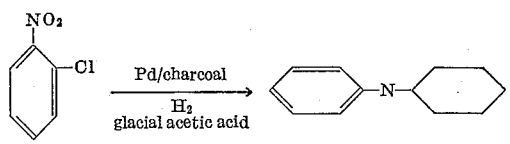

Examples of nitrohaloaromatic compounds containing only carbon, hydrogen, nitrogen, oxygen and halo atoms which may be used according to the process of this invention include o-nitrochlorobenzene,
o-nitrobromobenzene,
m-nitrochlorobenzene,
m-nitrobromobenzene,
p-nitrochlorobenzene,
p-nitrobromobenzene,
2-nitro-3-chlorotoluene,
2-nitro-3-bromotoluene,
2-nitro-4-chlorotoluene,
2-nitro-4-bromotoluene,
2-nitro-5-chlorotoluene,
2-nitro-5-bromotoluene,
2-chloro-3-nitrotoluene,
2-bromo-3-nitrotoluene,
2-chloro-4-nitrotoluene,
2-bromo-4-nitrotoluene,
2-chloro-5-nitrotoluene,
2-bromo-5-nitrotoluene,
3-nitro-4-chlorotoluene,
3-nitro-4-bromotoluene,
3-nitro-5-chlorotoluene,
3-nitro-5-bromotoluene,
2-nitro-3-chloroethylbenzene,
2-nitro-3-bromoethylbenzene,
2-nitro-4-chloroethylbenzene,
2-nitro-4-bromoethylbenzene,
2-nitro-5-chloroethylbenzene,
2-nitro-5-bromoethylbenzene,
2-chloro-3-nitroethylbenzene,
2-bromo-3-nitroethylbenzene,
2-chloro-4-nitroethylbenzene,
2-bromo-4-nitroethylbenzene,
2-chloro-5-nitroethylbenzene,
2-bromo-5-nitroethylbenzene,
3-nitro-4-chloroethylbenzene,
3-nitro-4-bromoethylbenzene,
3-nitro-5-chloroethylbenzene,
3-nitro-5-bromoethylbenzene,
2,6-dichloronitrobenzene,
2,6-dibromonitrobenzene,
2,4,5-trichloronitrobenzene, 2,4,6-tribromonitrobenzene,
2,4-dichloronitrobenzene,
2,4-dibromonitrobenzene,
2,5-dichloronitrobenzene,
2,5-dibromonitrobenzene,
3-nitro-4-chloro-o-xylene,
3-nitro-4-bromo-o-xylene,
3-nitro-5-chloro-o-xylene,
3-nitro-5-bromo-o-xylene,
3-nitro-5-chloro-o-xylene,
3-nitro-5-bromo-o-xylene,
3-chloro-4-nitro-o-xylene,
3-bromo-4-nitro-o-xylene,
3-chloro-5-nitro-o-xylene,
3-bromo-5-nitro-o-xylene,
3-chloro-6-nitro-o-xylene,
3-bromo-6-nitro-o-xylene,
2-nitro-3-chloro-p-xylene,
2-nitro-3-bromo-p-xylene,
2-nitro-6-chloro-p-xylene,
2-nitro-6-bromo-p-xylene, etc.,
2-chloronitronaphthalene,
2-bromonitronaphthalene,
4-chloronitronaphthalene,
4-bromonitronaphthalene,
2-methyl-4-chloronitronaphthalene,
2-methyl-4-bromonitronaphthalene, etc., the chloro and bromo substituted nitrochrysenes, anthracenes, phenanthrenes, pyrenes, etc. It is to be understood that the aforementioned nitrohaloaromatic compounds are only representatives of the class of compounds which may be hydrogenated according to the process of this invention and that said present invention is not necessarily limited thereto.

The hydrogenation of the nitrohaloaromatic compounds is effected in the presence of a catalyst comprising a noble metal composited on a solid support and in the presence of a solvent comprising an organic acid. Examples of the noble metal catalysts which may be used include palladium composited on a charcoal support, platinum composited on a charcoal support, ruthenium, rhodium, osmium and iridium each composited on a charcoal support, palladium on an inorganic oxide support such as palladium composited on alumina, palladium composited on silica, platinum composited on alumina, platinum composited on silica, palladium composited on a silica-alumina, platinum composited on a silica-alumina, ruthenium composited on an alumina, osmium composited on an alumina, rhodium composited on an alumina, iridium composited on an alumina, etc. The substantially inert organic solvent as hereinbefore set forth preferably comprises an organic acid such as glacial acetic acid, propionic acid, butyric acid, pentanoic acid, toluene-sulfonic acid, benzenesulfonic acid, etc., but may also include compounds selected from saturated hydrocarbons such as heptane, octane, cyclopentane, cyclohexane, methylcyclopentane, etc.; esters such as methyl acetate, ethyl acetate, propyl acetate, butyl acetate, etc.; amides such as N,N-dimethylformamide, N,N-diethylformamide, N,N-dipropylformamide, etc.; and mixtures of organic acids and water such as acetic acid and water. It is to be understood that the aforementioned solvents are only representative of the solvents which may be used, and that the present invention is not necessarily limited thereto.

The hydrogenation reaction is effected at hydrogenation conditions, said conditions including a temperature in the range of from about 30° to about 250° C., preferably in a range of from about 40° to about 100° C., and a pressure ranging from about 2 to about 200 atmospheres of hydrogen.

The process of this invention may be effected in any suitable manner and may comprise either a batch or a continuous type operation. When a batch type operation is used a quantity of the nitrohaloaromatic compound is placed in an appropriate apparatus such as a rotating autoclave along with the predetermined noble metal catalyst and the desired organic solvent. The autoclave is sealed and hydrogen pressed in until a predetermined pressure has been reached following which the autoclave is heated to the desired temperature and maintained thereat for a period of time sufficient to enable the hydrogenation of the nitrohaloaromatic compound to proceed to completion. At the end of this time the autoclave and contents thereof are allowed to cool to room temperature, the excess pressure is vented and the desired N-cyclohexylaniline is separated and recovered from unreacted starting materials, catalyst and/or undesired side reaction products.

The reaction may also be effected in a continuous type operation. A particularly suitable type comprises the fixed bed method of operation in which the catalyst is disposed as a fixed bed in a reaction zone which is maintained at the proper operating conditions of temperature and pressure. This reaction zone may comprise an unpacked vessel or coil or may be lined with an adsorbent packing material such as dehydrated bauxite, alumina, fire brick and the like. The nitrohaloaromatic compound to be hydrogenated is continuously charged to the reactor at a liquid hourly space velocity (volume of charge per volume of catalyst per unit of time) in a range of from about 0.5 to about 20, and preferably in a range of from about 0.5 to about 5. The particular organic solvent is also continuously charged to the reaction zone through a separate line or, if so desired, it may be admixed with the nitrohaloaromatic compound prior to entry into said reaction zone and charged thereto in a single stream. In addition to these two separate lines the hydrogen necessary to maintain the desired pressure and to accomplish the hydrogenation of the nitrohaloaromatic compound is also continuously charged to said reaction zone through separate means. The reaction product is continuously withdrawn from the reaction zone, separated from the reactor effluent, and recovered by conventional means such as fractional distillation, crystallization, etc., while the effluent may be recycled to the reactor.

In addition to the fixed bed type of operation hereinbefore described in which the feed stock passes through the bed of catalyst in either an upward or downward flow other types of continuous operation may also be employed. Examples of these types include the moving bed type operation in which the catalyst bed and the feed stock passes through the reaction zone either concurrently or countercurrently to each other and the slurry type process in which the catalyst is carried into the reaction zone as a slurry in the feed stock.

The following examples are given to illustrate the process of the present invention which, however, are not intended to limit the generally broad scope of the present invention in strict accordance therewith.

EXAMPLE I

A mixture of 50 g. (0.316 mole) of o-nitrochlorobenzene, 200 g. of glacial acetic acid and 5 g. of 5% palladium on carbon powder was placed in the glass liner of a rotating autoclave. The liner was sealed into the autoclave and an initial pressure of 130 atmospheres of hydrogen was pressed in. The autoclave was then heated slowly during a period of 1 hour to 75° C., during this time the pressure dropped to 70 atmospheres. The autoclave was then repressured with hydrogen up to 130 atmospheres and the temperature was maintained at 75° C. for an additional period of 4.5 hours. At the end of this time the autoclave and contents thereof were cooled to room temperature, the final pressure at room temperature being 78 atmospheres. The excess pressure was vented and the autoclave opened, the liner contents comprised 254 g. of a clear water white liquid, white crystals and black powdery catalyst. The crude product was recovered, filtered and the residue washed with excess acetic acid. The residue which consisted of catalyst and white crystals, the belting point of said crystals being 300–330, weighed 11 g. The crystals were water soluble and it was presumed that they were either an organic hydrochloride or acetate salt. After washing the 11 g. of residue with water, 5 g. of recovered catalyst were obtained. The aqueous wash was then combined with the bottoms obtained from the filtrate after removal of the acetic acid in vacuum. These bottoms were also crystalline in nature and soluble in water. A large amount of caustic was added to the clear aqueous solution and an upper layer formed which was then extracted with ether. The ether extract was washed, dried and distilled under reduced pressure. The distillation of this ether extract is set forth in Table I below.

Table I

| Cut | B.P., °C. | Press., mm. | B.P. at 760 mm. | Vol., cc. | $n_D^{20}$ |
|---|---|---|---|---|---|
| 1 | 81–82 | 0.21 | | 0.8 | 1.5604 |
| 2 | 82–87 | 0.21 | 276 | 2.0 | 1.5617 |
| 3 | 87–88 | 0.21 | 276 | 2.0 | 1.5614 |
| 4 | 88–88 | 0.21 | 276 | 4.5 | 1.5613 |
| 5 | 88–89 | 0.21 | 276 | 10.2 | 1.5613 |
| Botts | | | | [1] 0.5 | |

[1] Gram.

Cuts 1 through 5 were combined, the combined weight totaling 20 g. or a 73% yield. The structure of these cuts, comprising-N-cyclohexylaniline, were determined by various methods. An acetyl derivative of the product obtained was prepared, said acetyl derivative having a melting point of 71° C. This corresponds to the reported literature value of N-acetyl-N-cyclohexylaniline which is given at 70° C. (Beilstein XII 6, I 114, II 7). In addition, the total nitrogen was analyzed with the following results.

Found: N, 7.89. Calcd. as: $C_{12}H_{17}N$; N, 7.99. Carbon and hydrogen analysis—Found: C, 81.24; H, 9.66. Calcd: C, 82.23; H, 9.78.

EXAMPLE II

A mixture of 50 g. (0.316 mole) of o-nitrochlorobenzene, 200 g. of glacial acetic acid and 5 g. of a catalyst comprising platinum composited on alumina is placed in the glass liner of a rotating autoclave. The liner is sealed into the autoclave and an initial pressure of about 130 atmospheres of hydrogen is pressed in. The autoclave is then heated slowly during a period of 1 hour to about 75° C., during this time the pressure will drop. The autoclave is then repressured with hydrogen up to 130 atmospheres and the temperature is maintained at 75° C. for an additional period of 4.5 hours. At the end of this time the autoclave and contents thereof are cooled to room temperature, the excess pressure is vented and the autoclave is opened. The crude product which is recovered is treated in a manner similar to that set forth in Example I above. The desired N-cyclohexylaniline is separated and recovered.

EXAMPLE III

A mixture of 50 g. (0.316 mole) of o-nitrochlorobenzene, 200 g. of cyclohexane and 10 g. of a catalyst comprising platinum composited on alumina was placed in the glass liner of a rotating autoclave. The liner was sealed into the autoclave and hydrogen pressed in until an initial pressure of 100 atmospheres was reached. The autoclave was then slowly heated during a period of 1 hour to a temperature of about 100 °C., during which time the pressure dropped to approximately 60 atmospheres. The autoclave was then recharged with hydrogen to 100 atmospheres of pressure and the autoclave maintained at this temperature for an additional period of 4 hours. At the end of this time the autoclave and contents thereof were slowly cooled to room temperature, the final pressure at room temperature being about 38 atmospheres. The excess pressure was vented, the autoclave was opened and the product recovered from the liner. The product is treated in a manner similar to that set forth in Example I above and the desired product comprising 10 g. (35% yield) of N-cyclohexylaniline was separated and recovered.

EXAMPLE IV

A mixture of 50 g. of o-nitrobromobenzene, 200 cc. of glacial acetic acid and 5 g. of 5% palladium composited on charcoal is placed in the glass liner of a rotating autoclave which is substantially sealed into said autoclave. Hydrogen is pressed in until an initial pressure of 130 atmospheres is reached, after which the autoclave is slowly heated during a period of 1 hour to 75° C. The autoclave and contents thereof are maintained at this temperature for an additional period of 4.5 hours during which time the autoclave is repressured with hydrogen, if necessary, to maintain a pressure of 130 atmospheres. At the end of this time the autoclave and contents thereof are cooled to room temperature, the excess pressure is vented and the reaction product recovered from the liner. The desired N-cyclohexylaniline is separated and recovered by the conventional means set forth in Example I above.

EXAMPLE V

In this example the starting material comprises 50 g. of p-nitrochlorobenzene which, along with 200 g. of glacial acetic acid and 5 g. of 5% palladium on charcoal, was placed in the glass liner of a rotating autoclave and subjected to hydrogenation under conditions set forth in the above examples, that was, a temperature of about 75° C. and a pressure of about 130 atmospheres of hydrogen for a total period of about 4 hours. At the end of the residence time the autoclave and contents thereof were cooled to room temperature, the excess pressure was vented and the desired product comprising 20 g. (73% yield) of N-cyclohexylaniline was separated and recovered by conventional means.

EXAMPLE VI

In this example 50 g. of p-nitrobromobenzene along with 5 g. of a catalyst comprising platinum composited on charcoal and 200 cc. of propionic acid is subjected to hydrogenation under conditions similar to that set forth in Example I above. At the end of the desired residence time the desired reaction product comprising N-cyclohexylaniline, is separated and recovered from unreacting starting materials, catalyst and side reactions.

EXAMPLE VII

In this example 50 g. of o-nitrochlorobenzene along with 5 g. of 5% palladium on charcoal and 200 cc. of ethyl acetate was subjected to hydrogenation conditions similar to that set forth in Example I. At the end of the residence time of 5.5 hours the desired reaction product comprising 10 g. (35% yield) of N-cyclohexylaniline was separated and recovered using the procedure employed in Example I.

EXAMPLE VIII

In this example 50 g. of o-nitrochlorobenzene along with 5 g. of 5% palladium on charcoal and 200 cc. of cyclohexane was subjected to hydrogenation conditions set forth in Example I, that is, a temperature of 75° C., 130 atmospheres of hydrogen and residence time of 4.5 hours. After recovery and separation described in Example I there was obtained 13 g. (44% yield) of N-cyclohexylaniline.

EXAMPLE IX

In this example 58 g. of 3,4-dichloronitrobenzene along with 200 cc. of glacial acetic acid and 5 g. of 5% palladium on charcoal was subjected to hydrogenation conditions described in Example I. There was obtained 5 g. (18% yield) of N-cyclohexylaniline.

EXAMPLE X

In this example 50 g. of o-nitrochlorobenzene along with an equal mixture consisting of 100 cc. each of deionized water and glacial acetic acid together with 5 g. of 5% palladium on charcoal was subjected to the hydrogenation conditions described in Example I. After recovery there was obtained 4 g. (16% yield) of N-cyclohexylaniline.

EXAMPLE XI

A mixture of 50 g. of o-nitrochlorobenzene, 5 g. of a catalyst comprising palladium on charcoal and 200 cc. of N,N-dimethylformamide is subjected to hydrogenation under conditions similar to that set forth in Example I above. At the end of the desired reaction time the product comprising N-cyclohexylaniline is separated and recovered from unreacted starting materials, catalysts and side reaction products.

I claim as my invention:

1. A process for the production of N-cyclohexylaniline which comprises reacting o-nitrochlorobenzene with hydrogen in the presence of palladium and glacial acetic acid at a temperature in the range of from about 40° to about 100° C. and at a pressure in the range of from about 2 to about 200 atmospheres, and recovering the resultant N-cyclohexylaniline.

2. A process for the production of N-cyclohexylaniline which comprises reacting o-nitrobromobenzene with hydrogen in the presence of palladium and glacial acetic acid at a temperature in the range of from about 40° to about 100° C. and at a pressure in the range of from about 2 to about 200 atmospheres, and recovering the resultant N-cyclohexylaniline.

3. A process for the production of N-cyclohexylaniline which comprises reacting p-nitrobromobenzene with hydrogen in the presence of platinum and propionic acid at a temperature in the range of from about 40° to about 100° C. and at a pressure in the range of from about 2 to about 200 atmospheres, and recovering the resultant n-cyclohexylaniline.

References Cited in the file of this patent

UNITED STATES PATENTS

| | | |
|---|---|---|
| 1,845,280 | Jaeger | Feb. 16, 1932 |
| 2,132,389 | Bertsch | Oct. 11, 1938 |
| 2,587,149 | Gwynn | Feb. 26, 1952 |
| 2,631,167 | Werner | Mar. 10, 1953 |
| 2,700,060 | Cherlow et al. | Jan. 18, 1955 |
| 2,772,313 | Trager | Nov. 27, 1956 |
| 2,791,613 | Pray et al. | May 7, 1957 |
| 2,867,628 | Cass | Jan. 6, 1959 |